Jan. 25, 1949.  E. J. COLE  2,459,871
SPRING MOTOR
Filed Dec. 9, 1946  5 Sheets-Sheet 1

INVENTOR.
EDWARD J. COLE
BY
Clark + Ott
ATTORNEYS

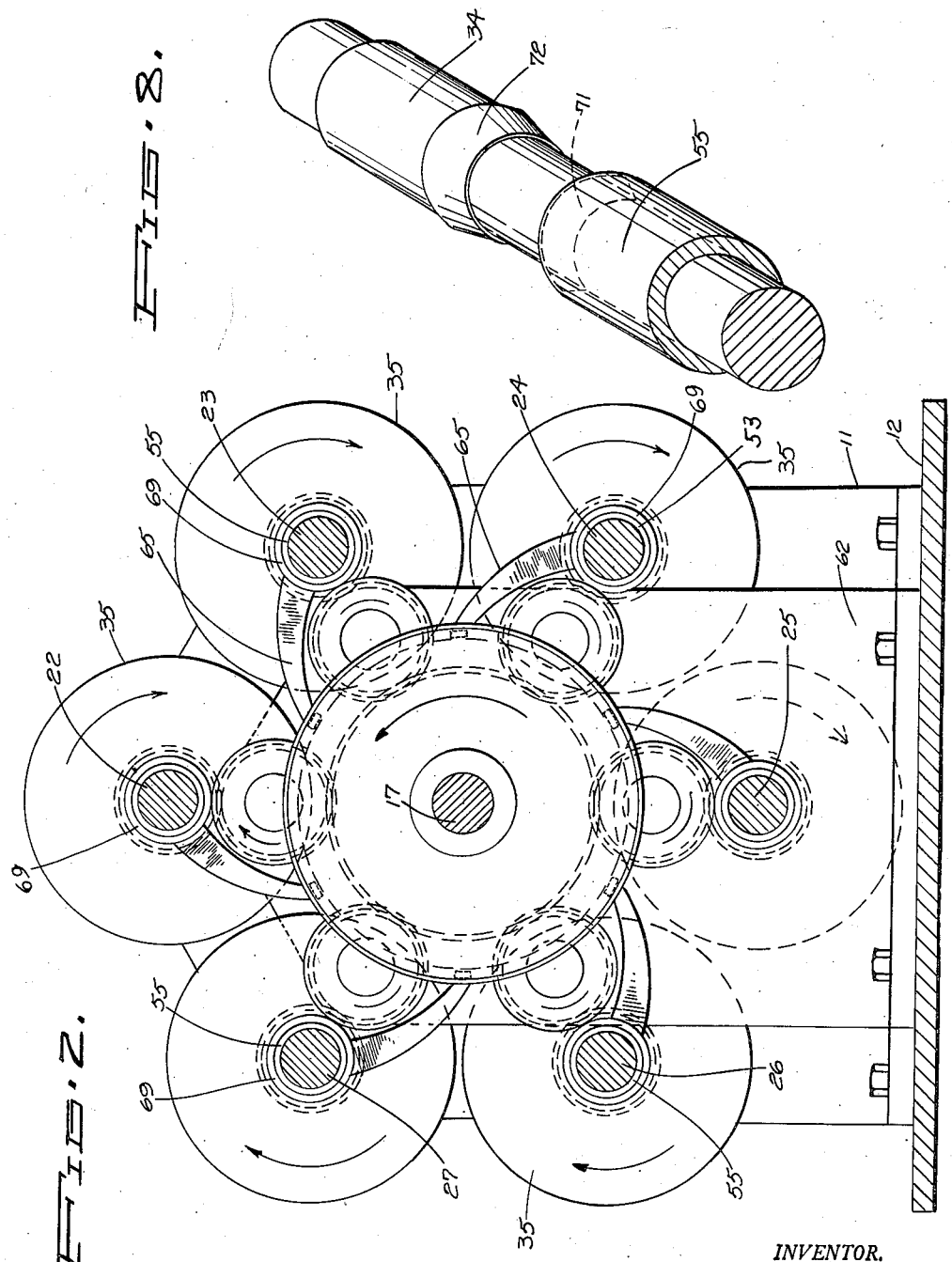

Jan. 25, 1949. E. J. COLE 2,459,871
SPRING MOTOR
Filed Dec. 9, 1946 5 Sheets-Sheet 3
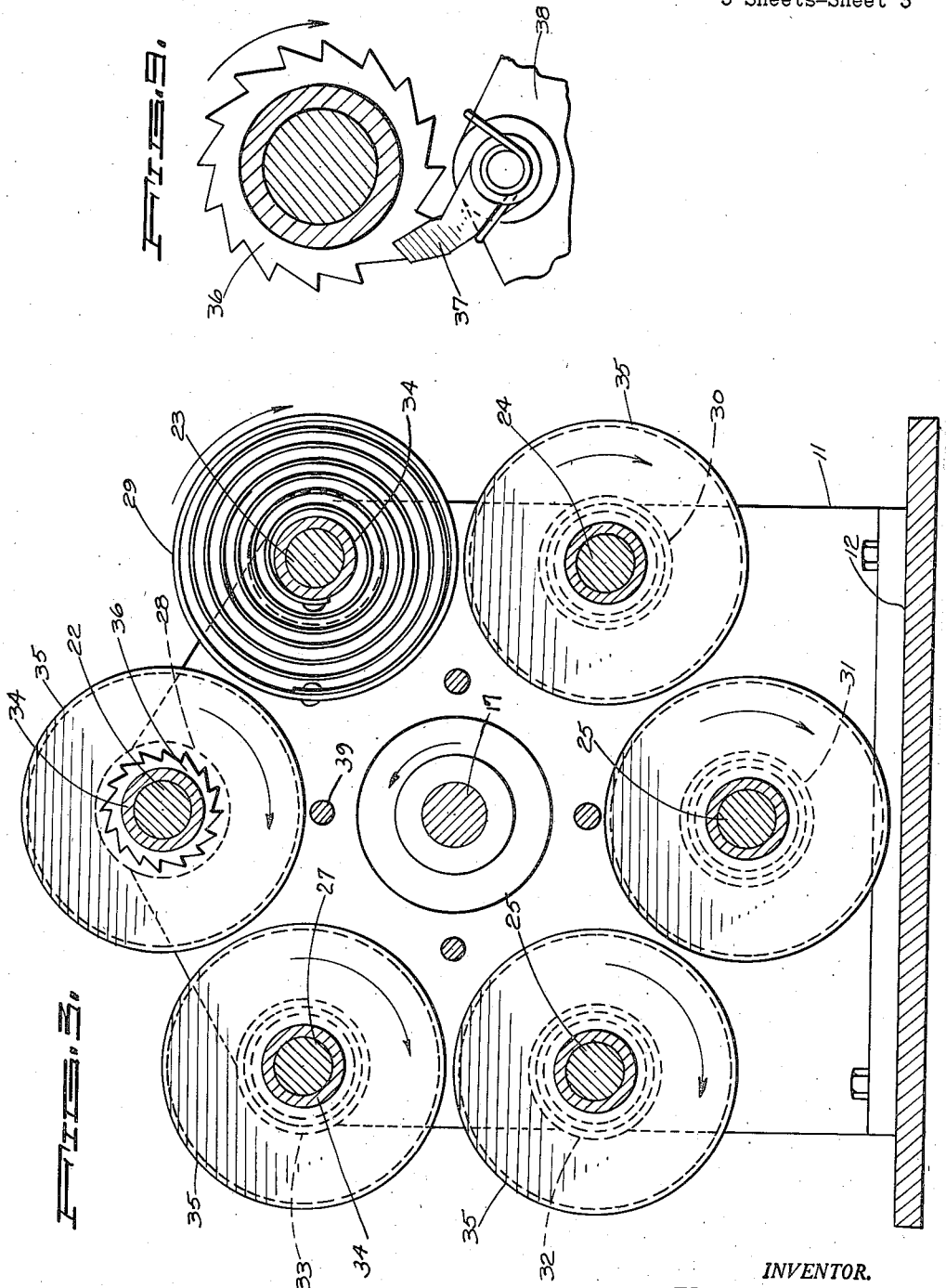
INVENTOR.
EDWARD J. COLE
BY
Clark & Ott
ATTORNEYS.

Jan. 25, 1949.  E. J. COLE  2,459,871
SPRING MOTOR
Filed Dec. 9, 1946  5 Sheets-Sheet 4
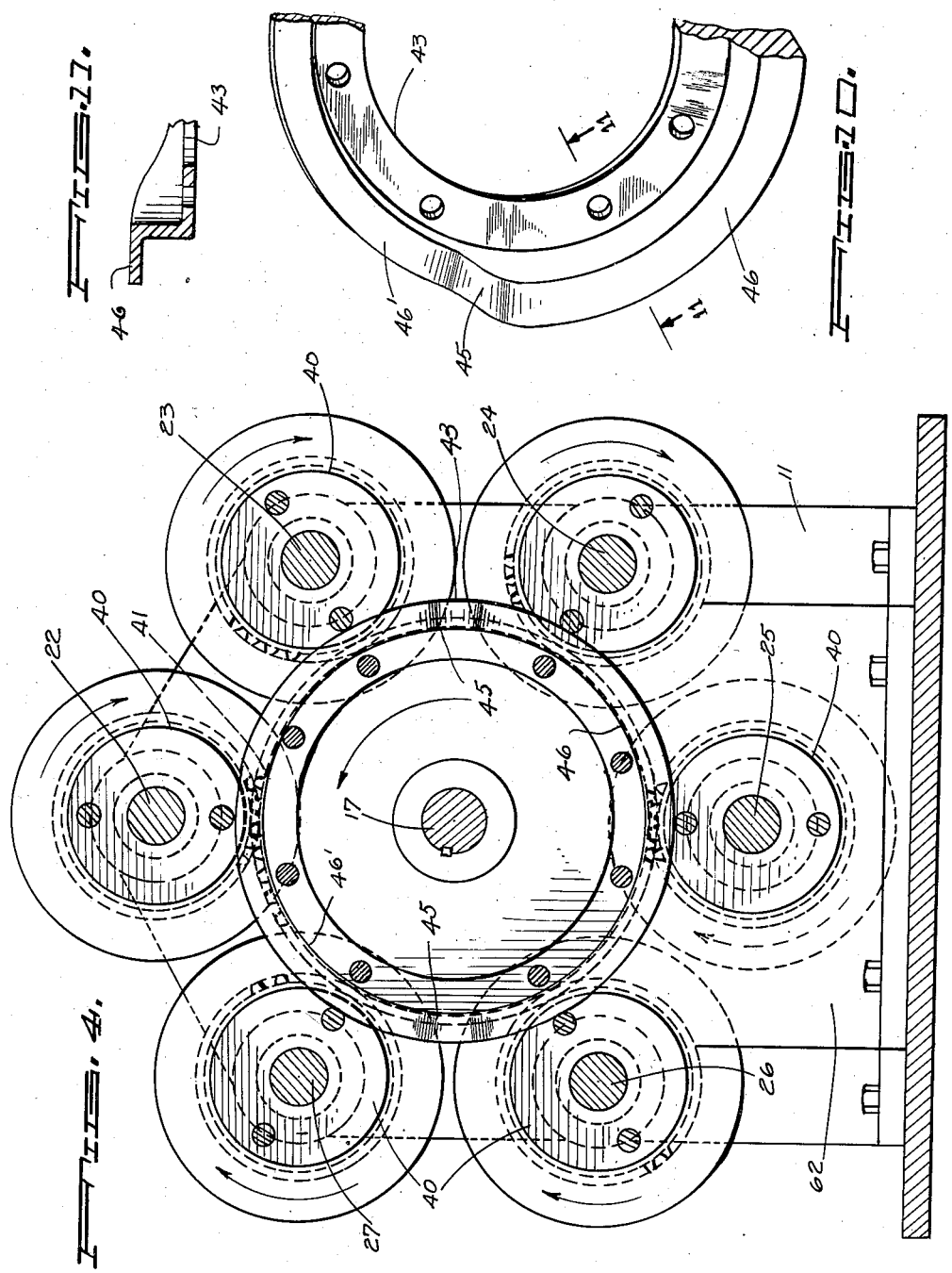
INVENTOR.
EDWARD J. COLE
BY
Clark & Ott
ATTORNEYS.

Jan. 25, 1949.  E. J. COLE  2,459,871
SPRING MOTOR
Filed Dec. 9, 1946  5 Sheets-Sheet 5
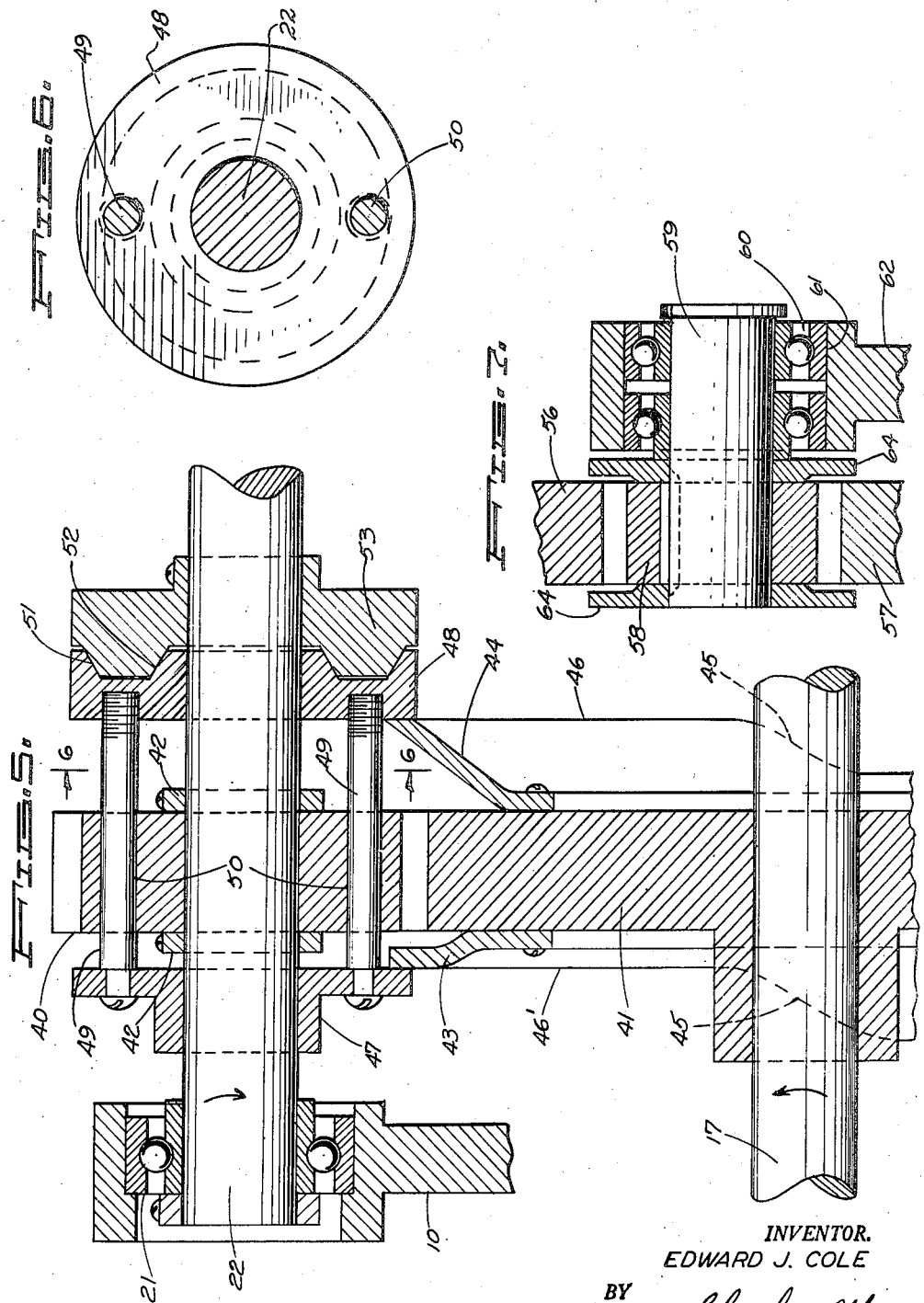
INVENTOR.
EDWARD J. COLE
BY
Clark & Ott
ATTORNEYS.

Patented Jan. 25, 1949

2,459,871

UNITED STATES PATENT OFFICE 2,459,871

SPRING MOTOR

Edward J. Cole, Peekskill, N. Y.

Application December 9, 1946, Serial No. 714,992

3 Claims. (Cl. 185—9)

This invention relates to a multiple spring motor for furnishing power through a driven shaft.

The invention comprehends a multiple spring motor for producing a sustained source of power by the successive utilization of the combined power of a number of the springs thereof to effect rotation of the driven shaft and to simultaneously rewind and restore a portion of the power to the remaining springs of said motor.

The invention has for a further object the provision of a multiple spring motor in which a number of the springs of the motor are arranged in a train for effecting rotation of the driven shaft by the combined power thereof and in which the train of springs functions to rewind and restore a portion of the power to the remaining springs of the motor and in which each spring is successively utilized so as to respectively constitute one of the springs of the train and one of the springs being rewound.

Another object of the invention is the provision of means for manually rewinding the springs as desired during operation of the motor or when the motor is idle or out of operation.

With the foregoing and other objects in view, reference is now made to the following specification and accompanying drawings in which the preferred embodiment of the invention is illustrated.

In the drawings:

Fig. 2 is a transverse vertical sectional view taken approximately on line 2—2 of Fig. 1 of the drawings.

Fig. 3 is a similar view taken approximately on line 3—3 of Fig. 1.

Fig. 4 is a transverse vertical sectional view taken approximately on line 4—4 of Fig. 1.

Fig. 5 is an enlarged fragmentary longitudinal sectional view through a portion of one of the spring shafts and in which is illustrated the means for coupling the same with the driven shaft.

Fig. 6 is a vertical sectional view taken approximately on line 6—6 of Fig. 5.

Fig. 7 is an enlarged fragmentary longitudinal sectional view showing the rotatable mounting for one of the idler gears utilized in the rewinding of the springs.

Fig. 8 is an enlarged perspective view of one of the clutch mechanisms arranged on one of the spring shafts.

Fig. 9 is an enlarged sectional view through one of the spring shafts showing one of the ratchet gears and keeper for holding the back tension of the spring and preventing unwinding thereof.

Fig. 10 is an enlarged perspective view of one of the cams affixed to the driven shaft gear.

Fig. 11 is a fragmentary sectional view taken approximately on line 11—11 of Fig. 10.

Figure 1:
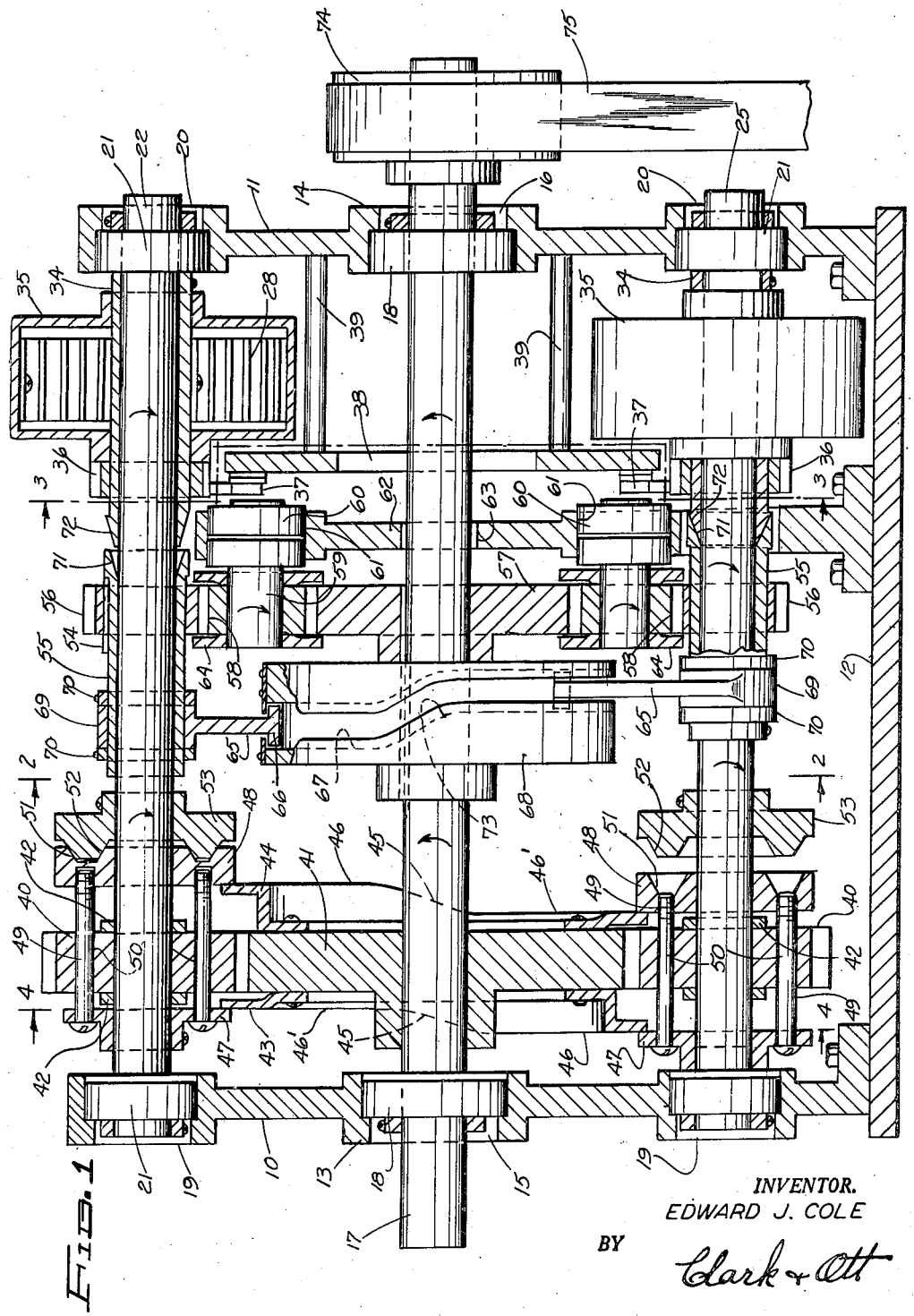
Fig. 1 is a longitudinal vertical sectional view through a multiple spring motor constructed in accordance with the invention.

Referring to the drawings by characters of reference, the motor includes a suitable frame which as indicated consists of spaced front and rear panels 10 and 11 secured in upright relation upon a base 12 and formed with central hubs 13 and 14 defining aligned openings 15 and 16 in which a driven shaft 17 is journaled on ball bearings 18.

The panels 10 and 11 are formed with a plurality of radially arranged openings 19 and 20 in which are journaled in ball bearings 21 parallel driving shafts 22, 23, 24, 25, 26 and 27 located equi-distantly from the driven shaft and spaced apart in the bearings 21 on arcs subtending 60 degrees. The shafts 22 to 27 inclusive are powered by means of torsion springs 28, 29, 30, 31, 32 and 33 respectively which are secured at their inner ends to sleeves 34 affixed to the said shafts with the outer ends of the springs secured to housings 35 surrounding the sleeves 34 and rotatable with reference thereto in a clockwise direction for winding the springs. The said springs turn the driving shafts in a clock-wise direction and provided on the tubular portions of the housings are ratchets 36 engaged by keepers 37 for preventing counter clock-wise rotation of the housings. The keepers 37 are pivotally secured to a centrally apertured plate 38 supported in surrounding spaced relation with the driven shaft 17 by means of a plurality of parallel bars 39 secured at their outer ends to the rear panel 11.

The driven shaft 17 is rotated in a counter-clockwise direction by the driving shafts 22 to 27 inclusive through meshing gears 40 and 41, the former being mounted on the driving shafts 22 to 27 inclusive for relative turning movement with reference thereto between collars 42 while the gear 41 is splined to the shaft 17. The power of each driving shaft 22 to 27 inclusive is successively utilized to drive the driven shaft 17 during a portion of each revolution of the driven shaft and in order to successively couple each of the driving shafts in a train of driving shafts oppositely disposed circular cam members 43 and 44 are provided which are formed with raised semi-circular cam tracks consisting of sloping cam faces 45 arranged intermediate semi-circular high and low flat face portions 46 and 46'. The cam members 43 and 44 are secured to the opposite side faces of the gear 41 with the low face portions 46' of the cam tracks disposed opposite the high face portions 46 thereof and with the cam faces 45 disposed in alignment. The cam tracks of the said cam members protrude beyond the periphery of the gear 41 into engagement with the inner faces of spaced heads 47 and 48 which are respectively arranged on opposite sides of the gears 40 on the shafts 22 to 27 inclusive for relative turning and longitudinal axial movement thereof with reference to the shafts. The heads 47 and 48 are connected together by parallel screws 49 slidably extending through apertures 50 in the gears 40 and the heads 48 are each formed with a recessed clutch face 51 adapted to engage with a complementary clutch face 52 of a clutch head 53 affixed to the driving shafts respectively for coupling the gears 40 to move therewith when the clutch heads 48 and 53 are in engagement. The cam members 43 and 44 rotating with the gear 41 function to cam the clutch heads 48 into and out of engagement with the clutch heads 53 by the camming action of the sloping cam faces 45 against the inner faces of the heads 47 and 48. When the high flat face portions 46 of the cam members 43 are engaged against the heads 47 the clutch heads 48 will be out of engagement with the clutch heads 53 and the gears 50 will rotate idly on the driving shafts. Similarly when the high flat face portions 46 of the cam members 44 are in engagement with the clutch heads 48 the same will be in engagement with the clutch heads 53 and the gears 50 will be coupled with the driving shafts. As illustrated in the drawings the pairs of cam members 43 and 44 have moved the clutch heads 48 into engagement with the clutch heads 53 of the driving shafts 22, 23 and 24 while the clutch heads 48 have been moved out of engagement with the clutch heads 53 of the driving shafts 25, 26 and 27. The driving shafts 22, 23 and 24 thus form a train for driving the driven shaft 17 while the shaft 27 is about to be coupled to form a part of said train and the shaft 24 is about to be uncoupled from the train.

In order to provide means for automatically winding the torsion springs 28 to 33 inclusive during a portion of each revolution of the driven shaft 17 when the clutch heads 48 and 53 are out of engagement, the driving shafts 22 to 27 inclusive are provided with tubular sleeves 55 which are mounted thereon for rotation and longitudinal axial shifting movement with reference to the driving shafts. The sleeves 55 are rotated relative to the driving shafts in a counter-clockwise direction by means of gears 56 which are rotated by the driven shaft 17 through gears 57 splined to said driven shaft and through idler gears 58 meshing therewith. The gears 56 are secured on the sleeves 55 by means of keys 54 which permit of longitudinal axial sliding of the said sleeves with reference to said gears. The idler gears 58 are splined to stub shafts 59 journaled in ball bearings 60 located in openings 61 in an upstanding panel 62 secured to the base 12 and formed with a central opening 63 through which the shaft 17 freely protrudes. Secured to the stub shafts 59 on the opposite sides of the idler gears 58 are collars 64 which extend outwardly beyond the periphery of the gears and between which the gears 56 have meshing engagement with the idler gears whereby the said gears are maintained in alignment irrespective of the axial shifting movement of the tubular sleeves 55 on the driving shafts 22 to 27 inclusive.

Axial reciprocatory movement is imparted to the sleeves 55 respectively by cam arms 65 having enlarged outer ends 66 engaging in a cam groove 67 formed in the periphery of a cam roller 68 splined to the driven shaft 17, there being one such cam arm for each of the tubular sleeves 55 mounted on the driving shafts 22 to 27 inclusive respectively as illustrated in Fig. 2 of the drawings. The cam arms 65 are formed with tubular bearing ends 69 which rotatably receive the forward ends of the tubular sleeves 55 therethrough. The sleeves 55 have collars 70 secured thereto on opposite sides of the bearing ends 69 to thereby move the sleeves 55 axially of the shafts 22 to 27 inclusive with the camming of the cam arms by the cam groove 67 and to permit of the sleeves 55 revolving with reference to the driving shafts. The confronting ends of the tubular sleeves 55 and the fixed sleeves 34 are formed with complementary clutch faces 71 and 72 which engage to couple the sleeves 34 with the tubular sleeves 55 when the cam portion 73 of the cam groove 67 functions to move the cam arms 65 and the tubular sleeves 55 rearwardly. When the sleeves 34 and 55 are thus engaged the sleeves 34 will be rotated in a counter-clockwise direction by the gears 56 to thereby rewind the torsion springs 28 to 33 inclusive which will take place when the clutch heads 48 are out of engagement with the clutch heads 53.

It is to be understood that the gear 41 and the cam roller 68 are arranged on the shaft 17 so that the clutch faces 71 of the sleeves 55 will be moved into engagement with the clutch faces 72 of the sleeves 34 of the driving shafts 22 to 27 inclusive by the inclined cam faces 73 of the cam roller 68 when the inclined cam faces 45 of the cam members 43 and 44 have moved the clutch heads 48 out of engagement with the clutch heads 53 and conversely when the clutch heads 48 have been moved into engagement with the clutch heads 53 the clutch faces 71 of the sleeves 53 will be out of engagement with the clutch faces 72 of the sleeves 34. Consequently the rewinding of the springs 28 to 35 inclusive takes place when the clutch faces 71 and 72 of the sleeves 55 and 34 are engaged and the clutch heads 48 and 53 are out of engagement. The clutch heads 53 and the sleeves 34 are adjustable on the shafts 22 to 27 inclusive for obtaining the proper clutching engagement between the clutch heads 48 and 53 and between the clutch faces 71 and 72.

The housings 35 being rotatable in a right hand direction with reference to the sleeves 34 may be manually rotated to effect rewinding of the springs 28 to 35 inclusive as desired both during operation of the motor and when the motor is not in use. In this manner certain of the springs may be manually rewound, the power of which will be transmitted to the driving shafts for providing a source of power through the driven shaft 17 and for rewinding the remaining springs. The rewinding of certain of the torsion springs 28 to 35 inclusive through the gears 54, 57 and 64 during each revolution of the shaft 17 functions to prevent too rapid dissipation of the power of the springs or two rapid rotation of the shaft 17 since part of the power of the springs is utilized in the rewinding of the remaining springs. The shaft 17 is provided with a driving wheel 74 about which is trained a belt 75 adapted to be connected with an instrumentality for driving the same.

What is claimed is:

1. In a spring motor, a driven shaft mounted for rotation, a plurality of parallel driving shafts located equi-distantly from the driven shaft and mounted for independent rotation, torsion springs secured to said driving shafts respectively, a gear on each of said driving shafts meshing with a gear affixed to said driven shaft, a clutch head affixed to each of said driving shafts, a complementary clutch head slidably carried by each of the gears on said driving shafts and adapted to engage with the fixed clutch heads for coupling the gears on said driving shafts to move with said shafts respectively, cam members affixed to the gear of the driven shaft, said cam members each having a cam track including high and low flat faces and an intermediate angularly disposed caming face disposed in engagement with the movable clutch head for moving the same into and out of engagement with the fixed clutch head for retaining the gears on said driving shafts in coupled relation to move with said shafts respectively during a portion of each revolution of said driven shaft and for retaining the gears on said driving shafts in uncoupled relation during the remainder of each revolution of said driven shaft, sleeves slidably mounted on said driving shafts respectively, said sleeves each being provided with a clutch face at one end thereof, said driving shafts having complementary clutch faces adapted to be engaged by the clutch faces of said sleeves for coupling the sleeves with the driving shafts respectively, interengaging gearing mounted on said sleeves and on said driven shaft for turning said sleeves in a direction opposite to the direction of rotation of the driving shafts by the tension of said torsion springs, cam arms carried by said sleeves and cam means carried by said driven shaft disposed in engagement with said cam arms for moving said sleeves to couple the same with the driving shafts respectively during a portion of each revolution of the driven shaft whereby the torsion springs are rewound by the rotation of said sleeves when rotated by said interengaging gearing.

2. In a spring motor, a driven shaft mounted for rotation, a plurality of parallel driving shafts located equi-distantly from the driven shaft and mounted for independent rotation, torsion springs secured to said driving shafts respectively, interengaging gearing mounted on said driving shafts and on said driven shaft, clutch means connected with the gearing on said driving shafts, cam means carried by said driven shaft and engaging with said clutch means for coupling the gearing on each of said driving shafts to its shaft during a portion of each revolution of said driven shaft for turning the driven shaft by the tension of said torsion springs and said cam means retaining the gearing on each of said driving shafts in uncoupled relation with its shaft during the remaining portion of each revolution of said driven shaft, an interengaging train of gearing connecting said driving shafts with said driven shaft for turning said driving shafts by said driven shaft in a direction opposite the direction of rotation of the driving shafts by the tension of said torsion springs, clutch means for coupling the driving shafts with said train of gearing and cam means carried by said driven shaft and engaging said last named clutch means for rendering the same active for coupling each of the driving shafts with said train of gearing during the portion of the revolution of the driven shaft that said driving shafts are in said uncoupled relation with the first mentioned gearing.

3. In a spring motor, a driven shaft mounted for rotation, a plurality of parallel driving shafts located equi-distantly from the driven shaft and mounted for independent rotation, torsion springs secured to said driving shafts respectively, interengaging gearing mounted on said driving shafts and on said driven shaft, clutch means connected with the gearing on said driving shafts, cam means carried by said driven shaft and engaging with said clutch means for coupling the gearing on a plurality of said driving shafts to their shafts respectively during a portion of each revolution of said driven shaft for turning the driven shaft by the tension of said torsion springs and said cam means retaining the gearing on the remainder of the driving shafts in uncoupled relation with their driving shafts respectively during the said portion of the revolution of the driven shaft, an interengaging train of gearing connecting said driving shafts with said driven shaft for turning said driving shafts by said driven shaft in a direction opposite the direction of rotation of the driving shafts by the tension of said torsion springs, clutch means for coupling the driving shafts with said train of gearing and cam means carried by said driven shaft for rendering said last named clutch means active for coupling each of the driving shafts with said train of gearing during the portion of the revolution of the driven shaft that said driving shafts are in said uncoupled relation with the first mentioned gearing.

EDWARD J. COLE.

REFERENCES CITED

The following references are of record in the file of this patent:

UNITED STATES PATENTS

| Number | Name | Date |
|---|---|---|
| 1,178,951 | Rutzen | Apr. 11, 1916 |
| 1,807,169 | Persico | May 26, 1931 |
| 1,890,609 | Joyner | Dec. 13, 1932 |
| 2,345,954 | Vigneri | Apr. 4, 1944 |